(12) United States Patent
Hansen

(10) Patent No.: US 9,935,932 B2
(45) Date of Patent: *Apr. 3, 2018

(54) WIRELESS SENSOR FIELD ENUMERATION

(71) Applicant: INTERMEC IP CORP., Everett, WA (US)

(72) Inventor: Michael Hansen, Everett, WA (US)

(73) Assignee: INTERMEC IP CORP., Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,596

(22) Filed: Jul. 18, 2016

(65) Prior Publication Data

US 2016/0330186 A1 Nov. 10, 2016

Related U.S. Application Data

(63) Continuation of application No. 13/827,357, filed on Mar. 14, 2013, now Pat. No. 9,396,337.

(60) Provisional application No. 61/623,005, filed on Apr. 11, 2012.

(51) Int. Cl.
*G06F 17/30* (2006.01)
*H04L 29/06* (2006.01)
*G06F 21/60* (2013.01)
*G06F 21/62* (2013.01)
*H04L 29/08* (2006.01)

(52) U.S. Cl.
CPC ........ *H04L 63/08* (2013.01); *G06F 17/30879* (2013.01); *G06F 21/60* (2013.01); *G06F 21/6218* (2013.01); *H04L 63/02* (2013.01); *H04L 67/12* (2013.01)

(58) Field of Classification Search
CPC ...... G06F 21/60; G06F 21/6218; G06F 21/88; G06F 19/321
See application file for complete search history.

(56) References Cited

U.S. PATENT DOCUMENTS

| 6,826,607 | B1 | 11/2004 | Gelvin et al. | |
|---|---|---|---|---|
| 6,832,251 | B1 | 12/2004 | Gelvin et al. | |
| 6,859,831 | B1 | 2/2005 | Gelvin et al. | |
| 7,020,701 | B1 | 3/2006 | Gelvin et al. | |
| 7,797,367 | B1 | 9/2010 | Gelvin et al. | |
| 7,844,687 | B1 * | 11/2010 | Gelvin | H04L 67/12 709/220 |
| 8,607,057 | B2 * | 12/2013 | Nath | H04L 9/008 370/389 |
| 8,613,107 | B2 * | 12/2013 | Peckover | G06F 21/10 726/29 |
| 8,779,921 | B1 * | 7/2014 | Curtiss | G08B 25/009 340/506 |

(Continued)

FOREIGN PATENT DOCUMENTS

| WO | 01/26068 A1 | 4/2001 |
|---|---|---|
| WO | 01/26327 A2 | 4/2001 |

(Continued)

*Primary Examiner* — Khoi Le
(74) *Attorney, Agent, or Firm* — Oliff PLC; R. Brian Drozd

(57) ABSTRACT

A system for authenticating data acquired by multiple sensors prior to storing the data in a database is described. The system also authenticates users requesting data access and intelligence agents that provide analyses of data stored in the database. As a result, any data or data analysis obtained from the system is traceable and reliable.

19 Claims, 11 Drawing Sheets

(56) References Cited

U.S. PATENT DOCUMENTS

| | | | |
|---|---|---|---|
| 2002/0010679 A1* | 1/2002 | Felsher | G06F 19/322 705/51 |
| 2005/0009498 A1* | 1/2005 | Ho | H04L 12/2803 455/402 |
| 2006/0242285 A1* | 10/2006 | Moriwaki | H04L 67/12 709/223 |
| 2008/0246629 A1* | 10/2008 | Tsui | H02J 7/0055 340/870.07 |
| 2008/0291855 A1 | 11/2008 | Bata et al. | |
| 2010/0148940 A1 | 6/2010 | Gelvin et al. | |
| 2010/0201516 A1 | 8/2010 | Gelvin et al. | |
| 2010/0232653 A1* | 9/2010 | Muquit | G06F 21/32 382/116 |
| 2011/0035491 A1 | 2/2011 | Gelvin et al. | |
| 2011/0167274 A1* | 7/2011 | Swamidas | H04L 63/08 713/176 |
| 2012/0059903 A1* | 3/2012 | Kim | H04L 67/12 709/217 |
| 2012/0197852 A1* | 8/2012 | Dutta | H04L 67/2804 707/692 |
| 2013/0078912 A1* | 3/2013 | San Vicente | A61B 5/0015 455/39 |

FOREIGN PATENT DOCUMENTS

| | | |
|---|---|---|
| WO | 01/26328 A2 | 4/2001 |
| WO | 01/26329 A2 | 4/2001 |
| WO | 01/26333 A2 | 4/2001 |
| WO | 01/26334 A2 | 4/2001 |
| WO | 01/26335 A2 | 4/2001 |

* cited by examiner

WIRELESS SENSOR FIELD ENUMERATION

CROSS-REFERENCE TO RELATED APPLICATION

This is a Continuation of application Ser. No. 13/827,357 filed Mar. 14, 2013, which claims the benefit of U.S. Provisional Application No. 61/623,005 filed Apr. 11, 2012. The disclosure of the prior applications is hereby incorporated by reference herein in its entirety.

BACKGROUND

Given the wide availability of low power and low cost wireless sensor technology, such as used with wireless sensing nodes, data can be collected from an unlimited number of sources. Although the large amount of available data may be useful, it can consume the available bandwidth of a wireless link if not managed correctly. For example, sensor network communications topologies, such as Zigbee, are typically low data rate, low range per node, and are low power systems.

BRIEF DESCRIPTION OF THE DRAWINGS

Examples of a system for validating sensor data and securely managing access to the sensor data by users and data analysts or intelligence agents are illustrated in the figures. The examples and figures are illustrative rather than limiting.

DETAILED DESCRIPTION

Figure 1A:
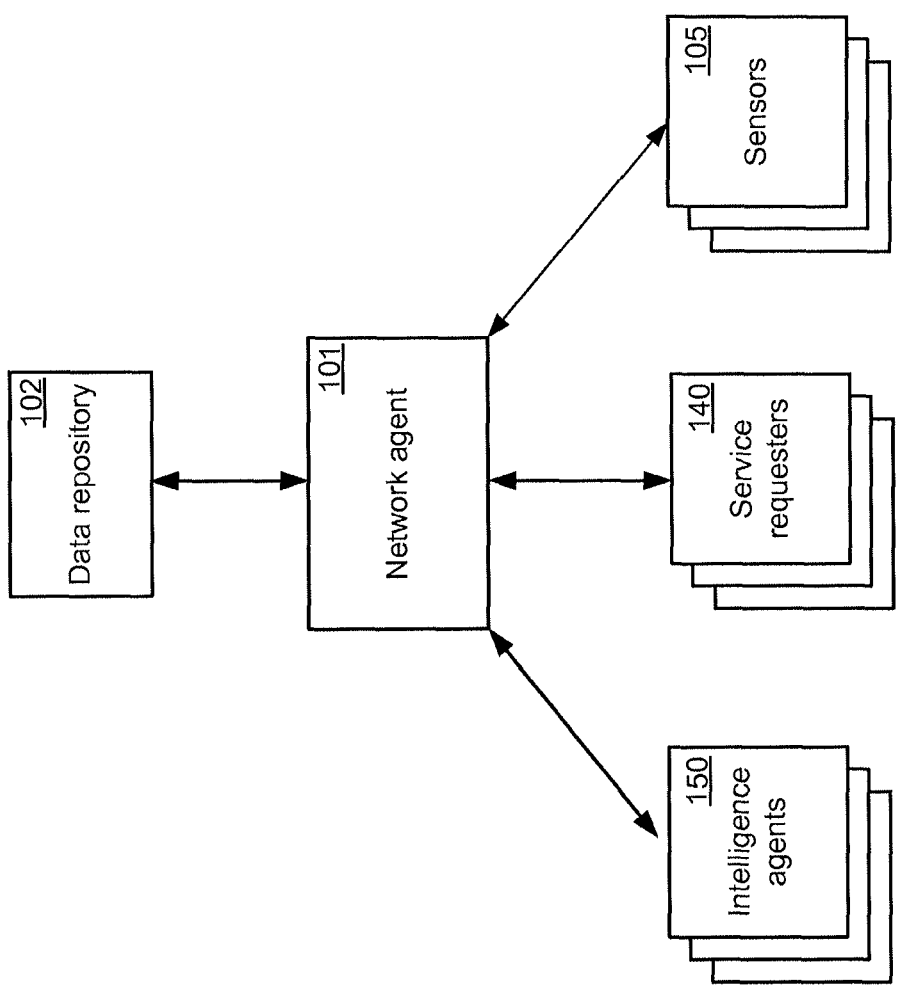
FIG. 1A shows example interactions of entities with the system.

A system is described that stores raw data gathered from multiple sensors and provides authenticated data and/or an authenticated analysis of the data to a registered user. The system is structured to validate data from authenticated sensors, authenticate users requesting data access, and authenticate intelligence agents and the data analysis provided by the intelligence agents so that any data or data analysis obtained from the system is traceable and reliable. The system allows any computer to receive sensor data and access distributed services available via, for example, the internet or cloud, to thereby interpret or understand received data and/or be able to present such data in usable formats.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Wireless sensors are readily available for a wide variety of measurements, for example, environmental measurements, package tracking, or personal health-related measurements. To maintain the integrity and traceability of the data measured by these sensors, a system should be capable of authenticating the sensors taking the measurements, ensuring that only authorized data is stored in a database, and only allowing authorized users to access the data. Further, the system should be able to establish consumer confidence in the intelligence provided by intelligence agents or data analysts by authenticating the identity of the analysts.

The system described in detail herein establishes data validation, data access authentication, intelligence confidence, and consumer trust. For a first example where the system would be applicable, a scientist having an advanced degree in soil science located in the Midwest in the United States can use sensors to track environmental conditions, such as soil conditions, the watering of crops located remotely in Washington or California. Based on the data provided by those sensors, the scientist can provide advice to farmers of those crops on yield improvements in real-time as weather conditions change. In another example, a coach in San Francisco can securely monitor the athletic output of cyclists in Oregon, Massachusetts, or Europe while they are participating in a cycling event. In yet another example, a warehouse manager in Atlanta can monitor the arrival of packages, each tagged with an RFID (radio frequency identification) tag, and the condition of packages still en route to his distribution center. Once the shipment of packages arrives, the manager can track the packages' placement in the warehouse through the RFID tags and also determine the packages' positions with a sensor field that can read the RFID tags and receive a map indicating their positions.

FIG. 1A shows example interactions of three entities with the system—sensors, service requester and intelligence agents. The sensors 105 measure data and send it to a data repository 102. A network agent 101 authenticates the sensors 105 and the data provided by the sensors so that only allow authorized data can be stored in the data repository 102. Additionally, the network agent 101 only allows the data in the data repository 102 to be accessed by authorized users. Users obtain authorization for accessing the data from the owner of the data. For example, if the data were financially valuable and/or confidential, the owner of the data would not want the data readily available to unauthorized users.

Another entity interacting with the network agent 101 is an individual requesting an analysis of a set of data, a service requester 140. The network agent 101 registers the service requester 140 and checks whether the requester 140 is authorized to access the data involved in the requested analysis. Further, the network agent 101 can provide a list of authorized analysts (described below) to the requester 140 and also obtain payment information from the requester 140. Use of the network agent 101 by a service requester 140 ensures that a selected intelligence agent from the provided list of analysts is trustworthy.

Finally, an intelligence agent 150 also interacts with the network agent 101 to provide intelligence services such as data analysis or data interpretation to registered service requesters 140. The intelligence agent 150 can be a human, computer, software code, or can take any other form that is capable of providing the requested data analysis or data interpretation. Independent of the form of the intelligence agent, the agent should be traceable and able to provide full disclosure on its form. The network agent 101 registers the intelligence agent 150 and adds the agent to the list of authorized analysts if it determines that the agent 150 is a legitimate provider of services. The intelligence agent 150 requests access to the data to be analyzed from the network agent 101, and the network agent 101 determines whether the agent 150 has been authorized to access the data prior to providing the data. In some instances the service requester 140 provides permission to the intelligence agent 150 to access the data, while in other instances the agent 150 independently obtains authorization for (and optionally arranges payment for) access to the data. Use of the network agent 101 by an intelligence agent 150 ensures that the service requester 140 and/or the intelligence agent 150 has legitimate access to the data to be analyzed, that the data has been authenticated, that the service requester 140 is able to pay for the requested services, and other checks described herein.

Figure 1B:
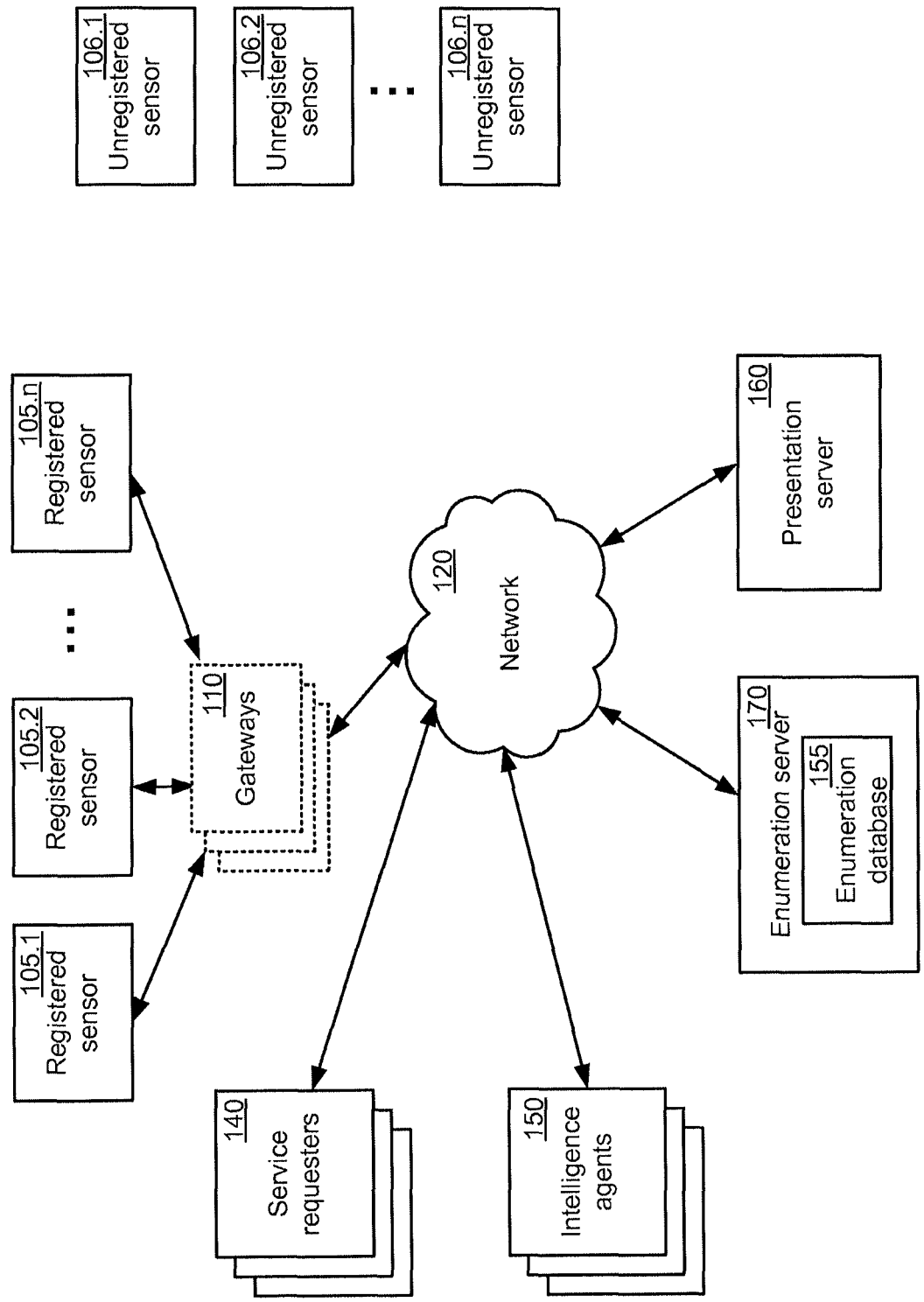
FIG. 1B illustrates an example system where service applicants and intelligence agents interact with a presentation server and/or an enumeration server, and an optional gateway aggregates data collected by the registered sensors.

FIG. 1B illustrates an example system where service requesters 140 and intelligence agents 150 can interact with a system that includes a presentation server 160 and an enumeration server 170 for ensuring authentication of all parties interacting with the system. Optional gateways 110 aggregate data collected by the registered sensors 105 and send the data to the enumeration database 155.

In general, network 120, over which the registered sensors 105, gateways 110, service requesters 140, intelligence agents 150, enumeration server 170 and presentation server 160 communicate, may be an open network, such as the Internet, or a private network, such as an intranet and/or the extranet, or any combination thereof.

In the example of FIG. 1B, registered sensors 105 are sensors that have been registered with the enumeration server 170. During the registration process, unique identifiers or enumerators for each sensor is stored in a database 155 accessible by the enumeration server 170. Examples of sensor enumerators can include, but are not limited to, the type of sensor, the manufacturer of the sensor, the owner of the sensor, the location of the sensor, the type of data collected by the sensor, and any other relevant commissioning information related to the sensor. Unregistered sensors 106 are sensors that have not been registered with the enumeration server 170. Data from the unregistered sensors 106 are not permitted to be uploaded to the enumeration server's database 155. While the enumeration database 155 is shown as part of the enumeration serer 170 in FIG. 1B, the enumeration database 155 can be separate from and external to the enumeration server 170.

In some cases, some of the registered sensors 105 have the capability to access the network 120, either wirelessly or through wired communications. As a result, these sensors can independently send data to the enumeration server 170 for storing in the enumeration database 155.

In some cases, at least some of the registered sensors 105 do not have the capability to access the internet independently. One or more gateways 110 aggregate the data from these sensors for uploading to the enumeration server's database 155. Each gateway 110 can be a stationary device or a mobile device registered with the system. Further, each gateway 110 can communicate with the registered sensors 105 either wirelessly or through wired communications.

Each gateway 110 has an internal memory that stores information about which sensors are registered with the enumeration server 170 and the type of data each of the registered sensors are permitted to write to the database 155. However, in some cases, a gateway 110 may not have the information needed to authenticate whether a particular sensor is registered or to manage the sensor's data. The gateway 110 can query the enumeration server 170 to determine the necessary information. Functions and techniques performed by the enumeration server 170 and related components therein are described below with reference to the example of FIG. 1C.

In some scenarios, there can be more than one enumeration server 170. For example, different enumeration servers 170 can store data from sensors located in distinct geographical regions, such as a building, a city block, or a city. Alternatively or additionally, different enumeration servers 170 can store data for different purposes, such as temperature data and package shipping data. With multiple enumeration servers 170, the gateway 110 can query all the enumeration servers 170 or all of the relevant enumeration servers 170 in an attempt to obtain the information needed to identify a sensor and manage the sensor's data. If the gateway 110 does not receive a response from an enumeration server 170 regarding a particular sensor, the sensor is assumed to be an unregistered sensor 106, and the gateway 110 does not accept the sensor's data for uploading to the database 155.

In some cases, a gateway 110 can even be a human collecting data from the sensors and uploading the data to the database 155. The human should be registered with the system and authorized to collect the data from the sensors 105 to ensure that only data from registered sensors are uploaded to the database 155.

In the example of FIG. 1B, service applicants 140 can be any user that accesses the presentation server 160 to request a data analysis, interpretation, or presentation of data that is stored in the enumeration database 155.

In the example of FIG. 1B, intelligence agents 150 can be any analyst that requests access to data stored in the enumeration database 155 to provide an analysis of the data to a service applicant 140. Additionally, the intelligence agents 150 can upload a report containing an analysis to the presentation server 160 for a service applicant 140 to access.

Functions and techniques performed by the presentation server 160 and related components therein are described below with reference to the example of FIG. 1D.

Figure 1D:
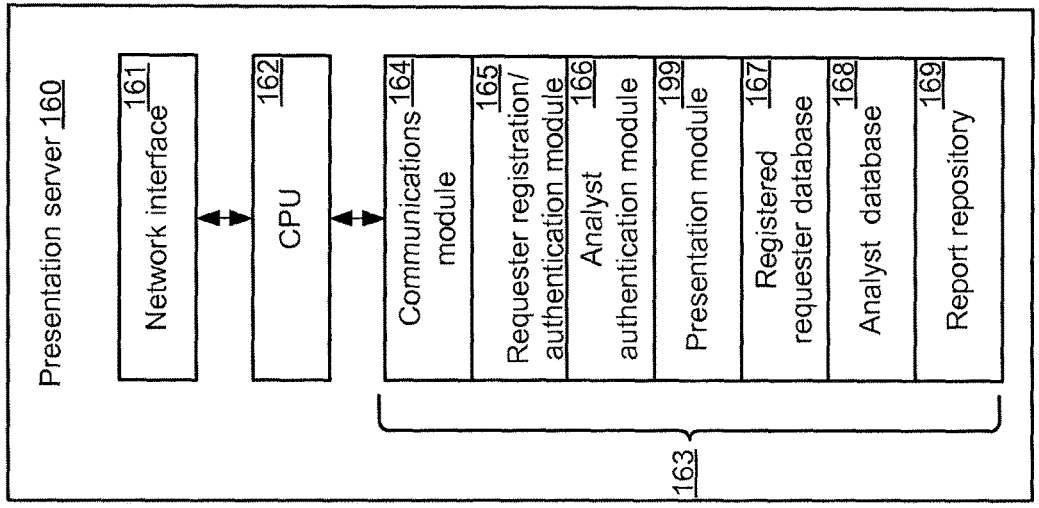
FIG. 1D shows a block diagram illustrating an example of components in the presentation server that authenticate service requesters, intelligence agents, and data reports.
Figure 1C:
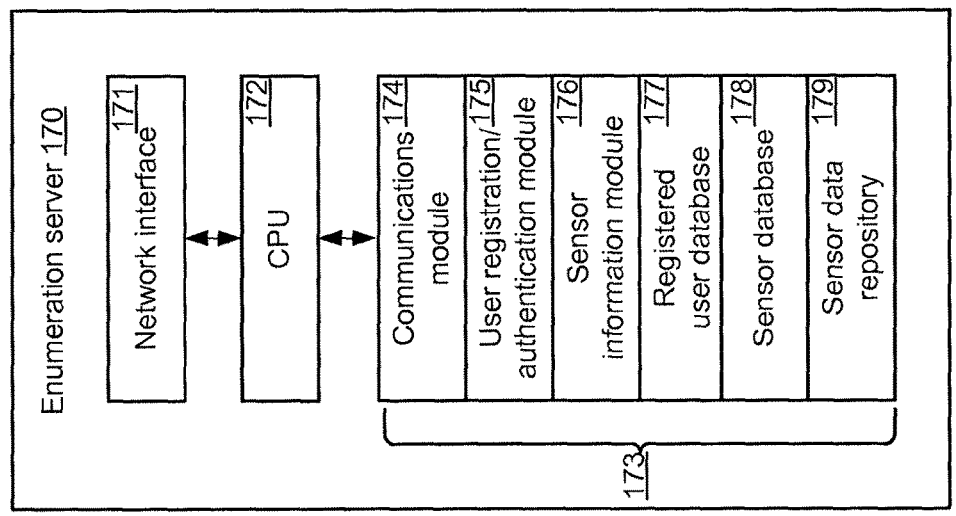
FIG. 1C shows a block diagram illustrating an example of components in the enumeration server that maintain traceability of data obtained from registered sensors.

FIG. 1C shows a block diagram illustrating an example of components in the enumeration server 170 that maintain the integrity of data obtained from registered sensors. The enumeration server 170 includes conventional server computer components, including a CPU (central processing unit) 172 coupled to a network interface 171 and a memory 173. The memory 173 stores several computer programs including a communications module 174 configured to establish network communications via the network interface 171. The memory 173 also stores a user registration/authentication module 175 and a sensor information module 176. The modules 175 and 176 operate in conjunction with a registered user database 177, a sensor database 178, and a sensor data repository 179. The registered user database 177, sensor database 178, and sensor data repository 179 can be implemented as, for example, a relational database. Additional or fewer components can be included in the enumeration server 170.

In the example of FIG. 1C, the sensor information module 176 registers a sensor for providing data to the sensor data repository 179. During registration, the sensor information module 176 obtains information pertaining to the sensor such as the type of sensor, the manufacturer and owner of the sensor, the location of the sensor, whether the sensor will need to upload its data through a gateway, and any other relevant information and stores the information in the sensor database 178. The sensor information module 176 can also provide a unique identification code to the sensor to assist in tracing data provided by the sensor. A non-limiting example of the unique identification code is the serial number of the sensor. In one embodiment, the sensor can send an encrypted hash value of the data. The hash value can be generated by a secret hash function established at the time of commissioning and known only to the sensor and the enumeration server 170. The sensor provides its identification code to the sensor information module 176 when communicating with the enumeration server 170 to provide data to the sensor data repository 179. Alternatively, if the sensor cannot directly access the network, the sensor can provide its identification code to a gateway for authentication purposes, and the gateway uploads the sensor's data to the sensor data repository 179 if the sensor and sensor's data is appropriately authenticated.

The sensor information module 176 also registers a gateway for aggregating data from registered sensors. During registration, the sensor information module 176 obtains information pertaining to the gateway such as whether the gateway is mobile, stationary, or a person, the registered sensors for which the gateway will be uploading data, and any other relevant information and stores the information in the sensor database 178. The sensor information module 176 can also provide a unique identification code to the gateway. The identification code can be presented by the gateway to the sensor information module 176 when uploading data from sensors to the sensor data repository 179.

If the sensor information module 176 receives a query from a registered gateway about whether a sensor is registered and how to manage the sensor's data, the sensor information module 176 can access the information stored in the sensor database 178 and send it to the querying gateway.

The purpose for registering the sensors and gateways is to ensure that the data uploaded to the repository 179 is traceable and reliable. Data that has not been properly authenticated is not permitted to be stored in the sensor data repository 179.

In the example of FIG. 1C, the user registration/authentication module 175 registers any user who wishes to access data stored in the sensor data repository 179. During registration, the user registration/authentication module 175 obtains information about the user such as name, address, relation to the owner of the sensor or sensor data, payment method and payment information, and any other relevant information and stores the information in the registered user database 177. The user registration/authentication module 175 can also provide a unique username and password to the registered user for authenticating the user at a later time.

In some instances, the owner of a registered sensor can register to obtain access to the data provided by the sensor and stored in the sensor data repository 179. In some instances, a registered user who is not the owner of the sensor can access certain data sets stored in the sensor data repository 179 with permission of the owner of the sensor and optionally upon paying a fee to the owner.

In some instances, the registered user database 177, the sensor database 178, and/or the sensor data repository 179 can be external to the enumeration server 170.

FIG. 1D shows a block diagram illustrating an example of components in the presentation server 160 that provides authentication of service requesters, intelligence agents, and data reports. Similar to the enumeration server 170, the presentation server 160 includes conventional server computer components, including a CPU 162 coupled to a network interface 161 and a memory 163. The memory 163 stores several computer programs including a communications module 164 configured to establish network communications via the network interface 161. The memory 163 also stores a requester registration/authentication module 165, an analyst authentication module 166, and a presentation module 199. The modules 165, 166, and 199 operate in conjunction with a registered requester database 167, an analyst database 168, and a report repository 169. The registered requester database 167, analyst database 168, and report repository 169 can be implemented as, for example, a relational database. Additional or fewer components or modules can be included in the presentation server 160.

In the example of FIG. 1D, the requester registration/authentication module 165 registers any user who wishes to make a request for an analysis of data, interpretation of data, or presentation of data in a particular format. During registration, the requester registration/authentication module 165 obtains information about the requester such as name, address, relation to the owner of the sensor or sensor data (if any), payment method and payment information, authorization to access specific data sets, and any other relevant information and stores the information in the registered requester database 167. The requester registration/authentication module 165 can also provide a unique username and password to the registered requester for authenticating the requester by the requester registration/authentication module 165 when accessing a data analysis or report. The requester registration/authentication module 165 can also assign an identification code for the requested report, and the code is stored in the report repository 169 along with information pertaining to the requested report, such as data sets to be accessed.

The purpose for registering a requester of a data analysis or presentation is to obtain identification information of the requester, ensure the requester is authorized to access the data that will be the subject of the requested analysis, and ensure that the requester can pay for the analysis.

In the example of FIG. 1D, the analyst authentication module 166 registers any analyst who wishes to provide intelligence services to service requesters where the intelligence services are based upon data stored in the sensor data repository 179. During registration, the analyst authentication module 166 obtains information about the analyst such as name, qualifications, and any other relevant information and stores the information in the analyst database 168. If an analyst has provided data analysis reports through the presentation server 160 in the past, this information is added to the analyst database 168. The analyst authentication module 166 can also provide a unique username and password to the registered analyst for authenticating the analyst upon uploading a report to the report repository 169.

The analyst authentication module 166 can provide a list of registered analysts to a report requester. Once the requester has selected an analyst, the analyst is provided with the identification code for the report assigned by the requester registration/authentication module 165. The code can be used to confirm that the requested report is provided by the requested analyst. The code also identifies the data sets that the requester is authorized to access with respect to a particular analysis request. The code can be linked to information in the sensor data repository 179, the report repository 169, the registered requester database 167, and/or the analyst database 168.

After the analyst authentication module 166 authenticates an analyst and report code, the analyst is provided access to the data sets associated with the code that the requester is authorized to access. However, in some instances, it is the analyst who has authorization to access the data sets to be analyzed rather than the requester. For example, the analyst paid for access to the data on a subscription basis, or the analyst owns the sensors measuring the data. If either the requester or the analyst is authorized to access the data sets, the analyst authentication module 166 sends the information to the user registration/authentication module 175 in the enumeration server 170 to request the data stored in the sensor data repository 179. Thus, the enumeration server 170 ensures the integrity and traceability of the sensor data and further ensures that only authorized individuals can access the data, while the presentation server 160 ensures the identity of the service requester and the analyst to each other to provide consumer confidence.

In some instances, the registered requester database 167, the analyst database 168, and/or the report repository 169 can be external to the presentation server 160.

In some embodiments, there is a presentation module 199 in the presentation server 160 that assists in the presentation of data to a user authorized to access the data. The presentation module 199 can query a user when he registers with the user registration/authentication module 175 for a preferred presentation format for the requested data. The presentation format details can be stored in the sensor data repository 179. Then when the user requests access to the data, the data can be presented to the user by the presentation module 199 in the designated format. Examples of services provided by the presentation module 199 include, but are not limited to, instantaneous values of data obtained by a sensor, graphing of a time series of sensor data with tolerance bars, linear regression or curve fitting of sensor data, and correlation of sensor data against any other form of available metadata stored in the sensor data repository 179.

Figure 2:
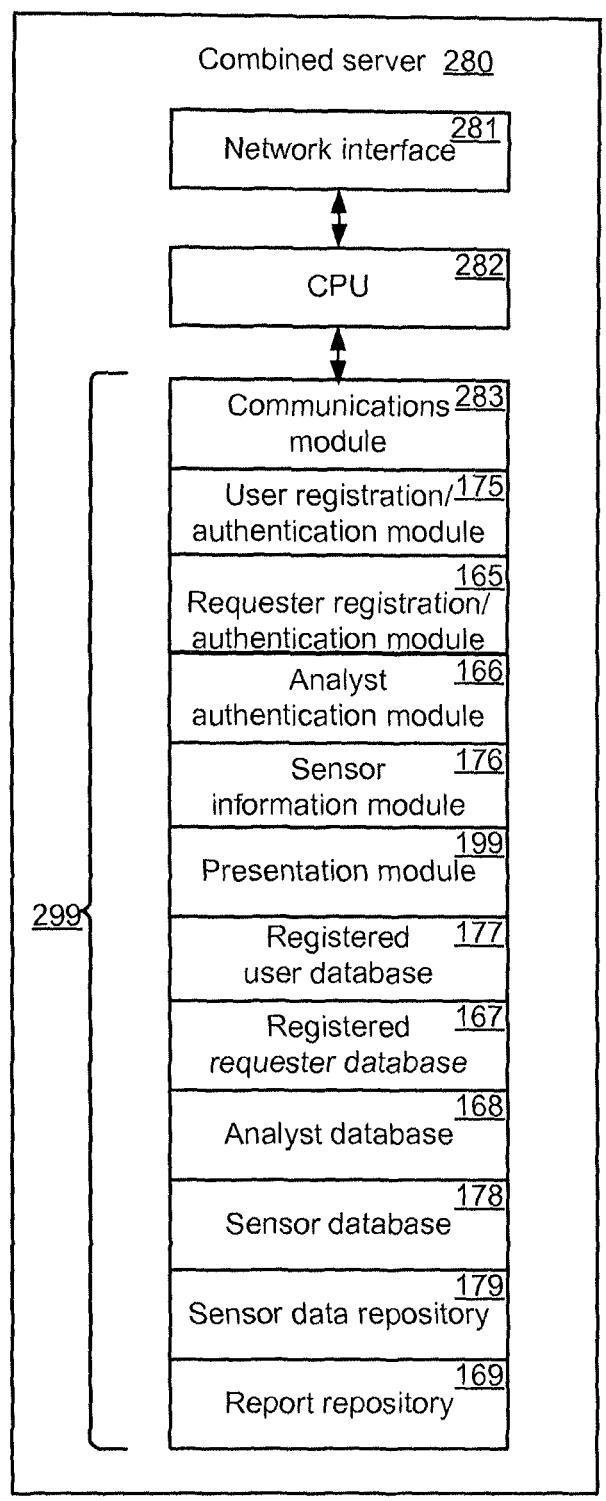
FIG. 2 shows a block diagram of a combined server performing the functions of the enumeration server and the presentation server.

In some embodiments, a combined server 280 can perform the functions of both the enumeration server 170 and the presentation server 160. A block diagram of the combined server 280 is shown in FIG. 2. Many of the components in the enumeration server 170 and the presentation server 160 shown in FIGS. 1C and 1D are components in the combined server 280. The components shown with the same reference numbers have the same or similar structure or function.

With the combined server 280, the components unique to the enumeration server 170 still ensure the integrity and traceability of the data obtained from the registered sensors and still ensure that only authorized individuals can access the data. Also, the components unique to the presentation server 160 that are part of the combined server 280 still ensure the identity of the service requester and the analysis provider to provide consumer trust and confidence.

Figure 3:
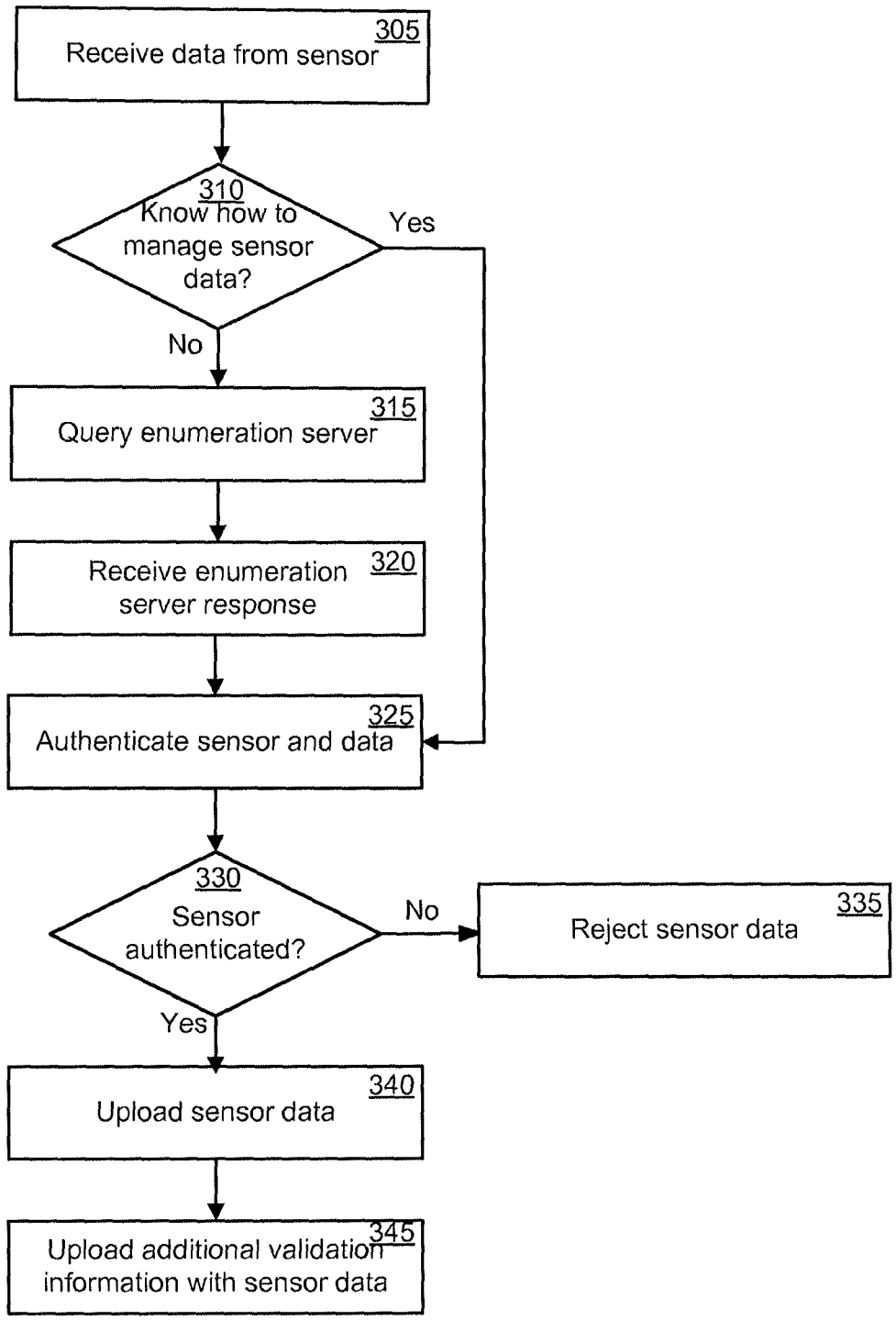
FIG. 3 is a flow chart illustrating an example of a method of authenticating and storing data from registered sensors using a data gateway.
Figure 4A:
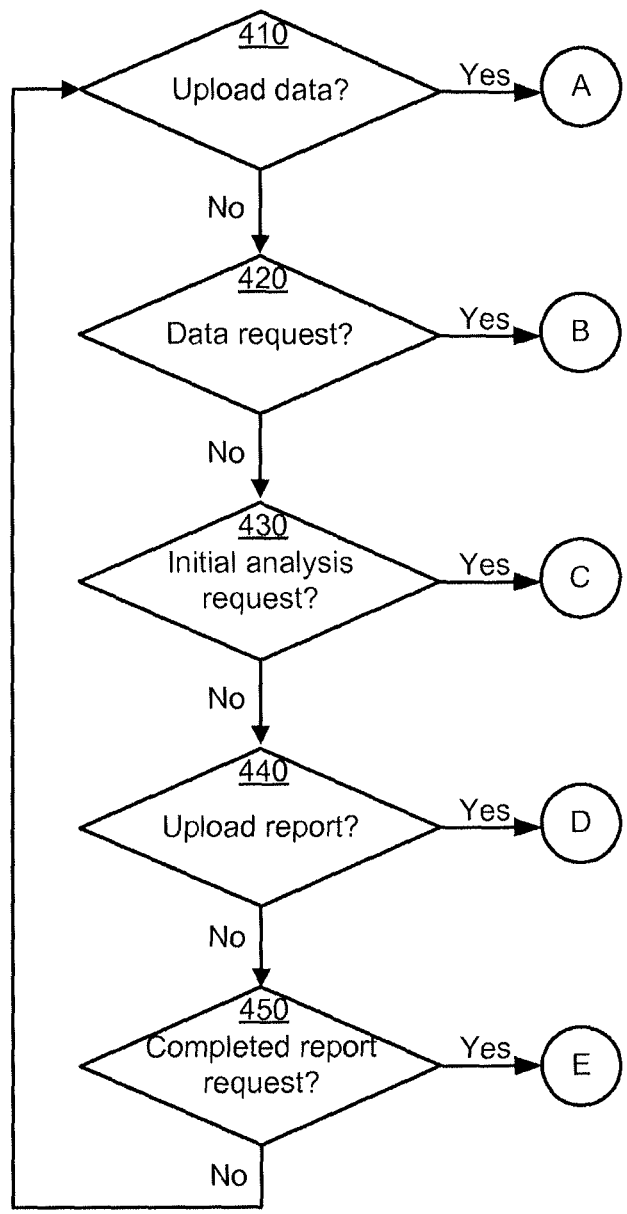
FIGS. 4A-4F show flow charts illustrating an example of a method in which the system interacts with entities wishing to upload data, request data, make an initial data analysis request, upload a data report, or request a data report.
Figure 4B:
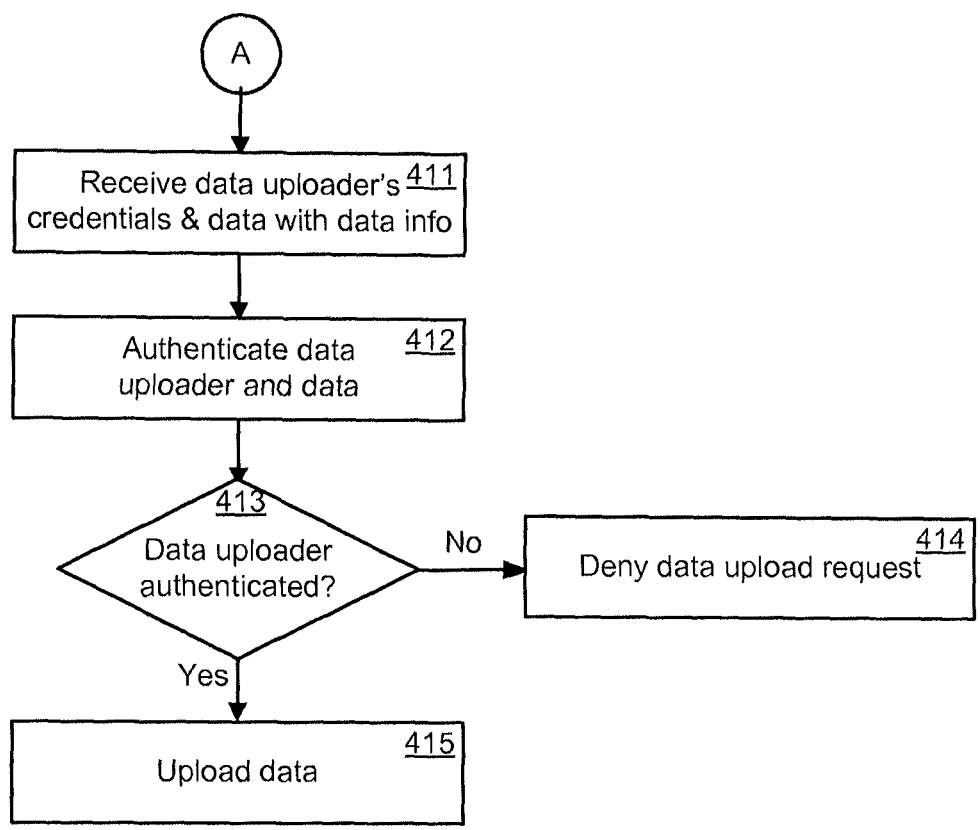
Figure 4C:
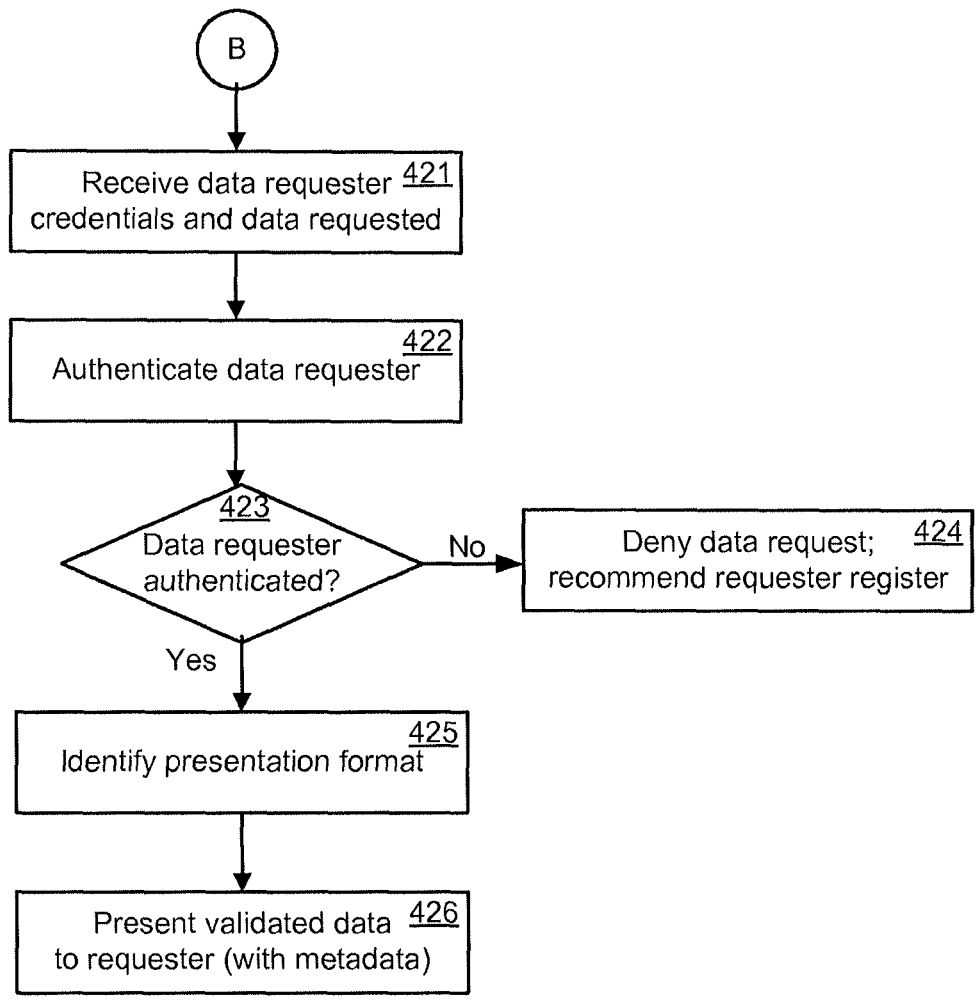
Figure 4D:
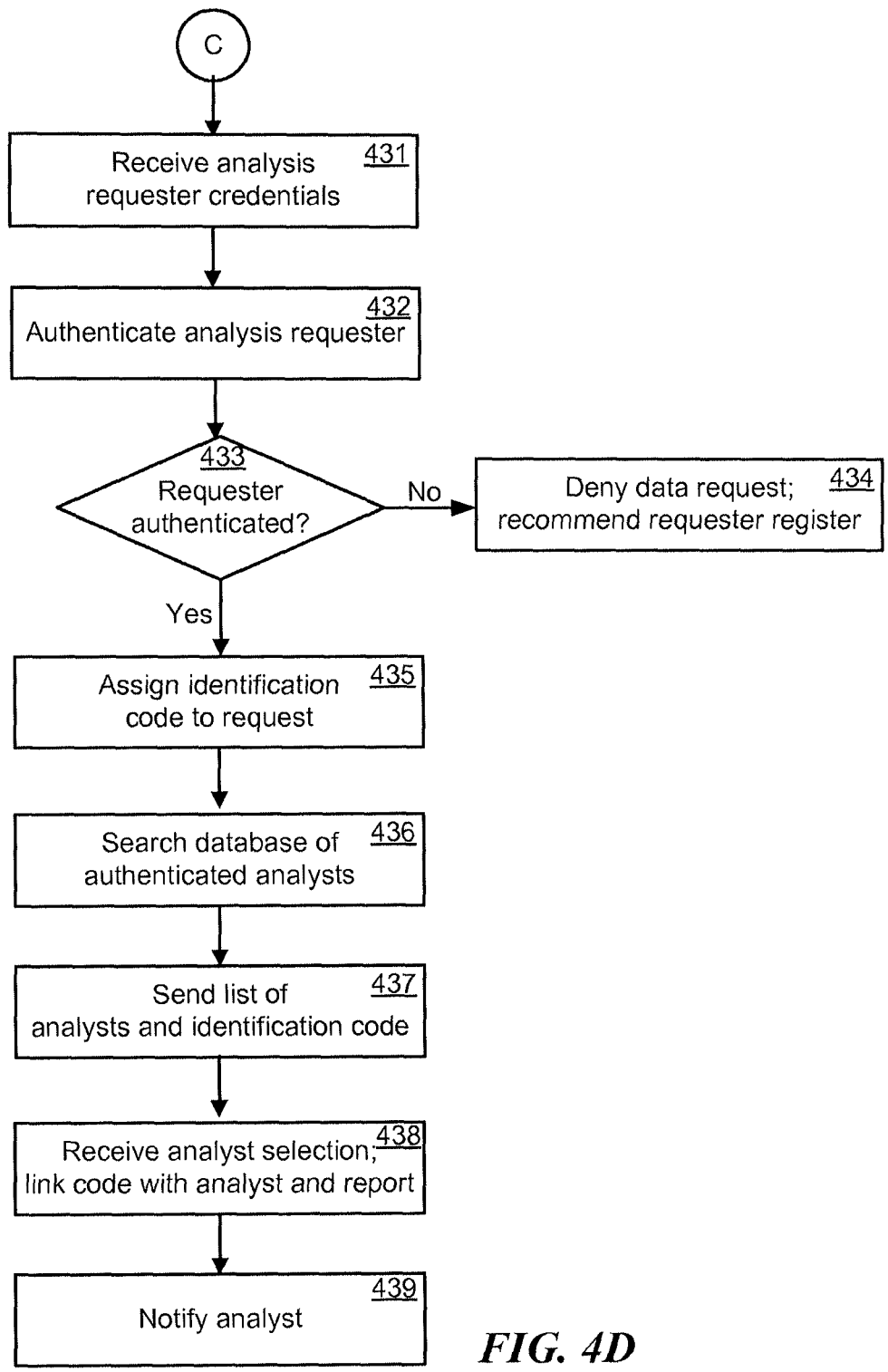
Figure 4E:
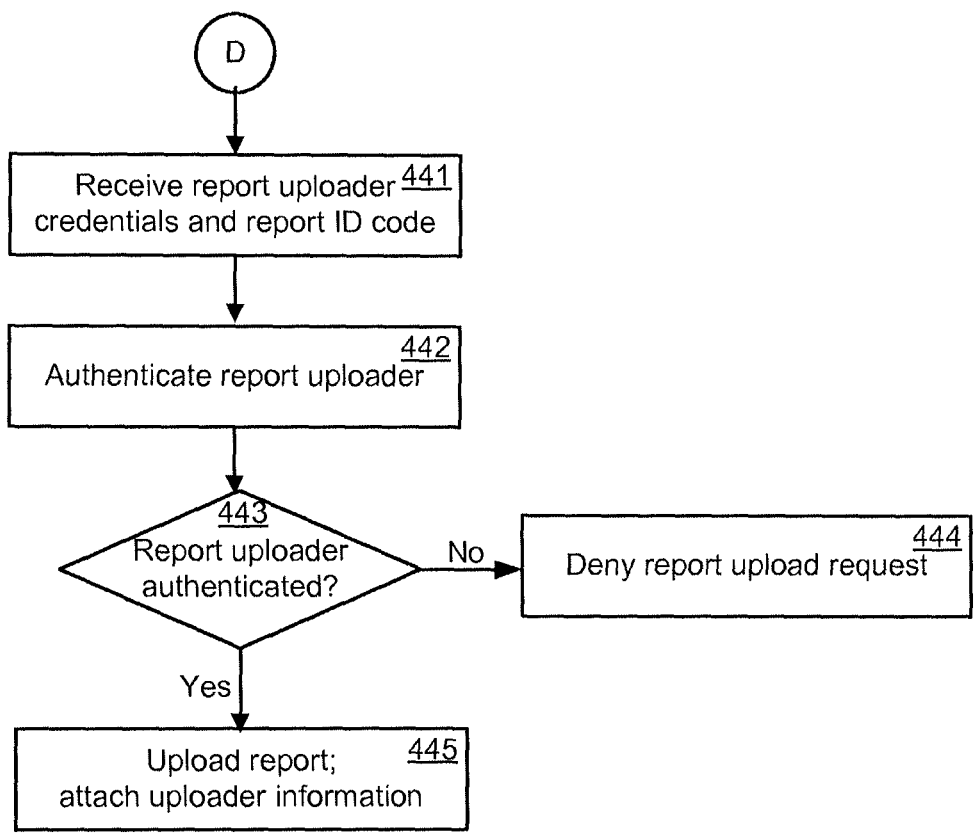
Figure 4F:
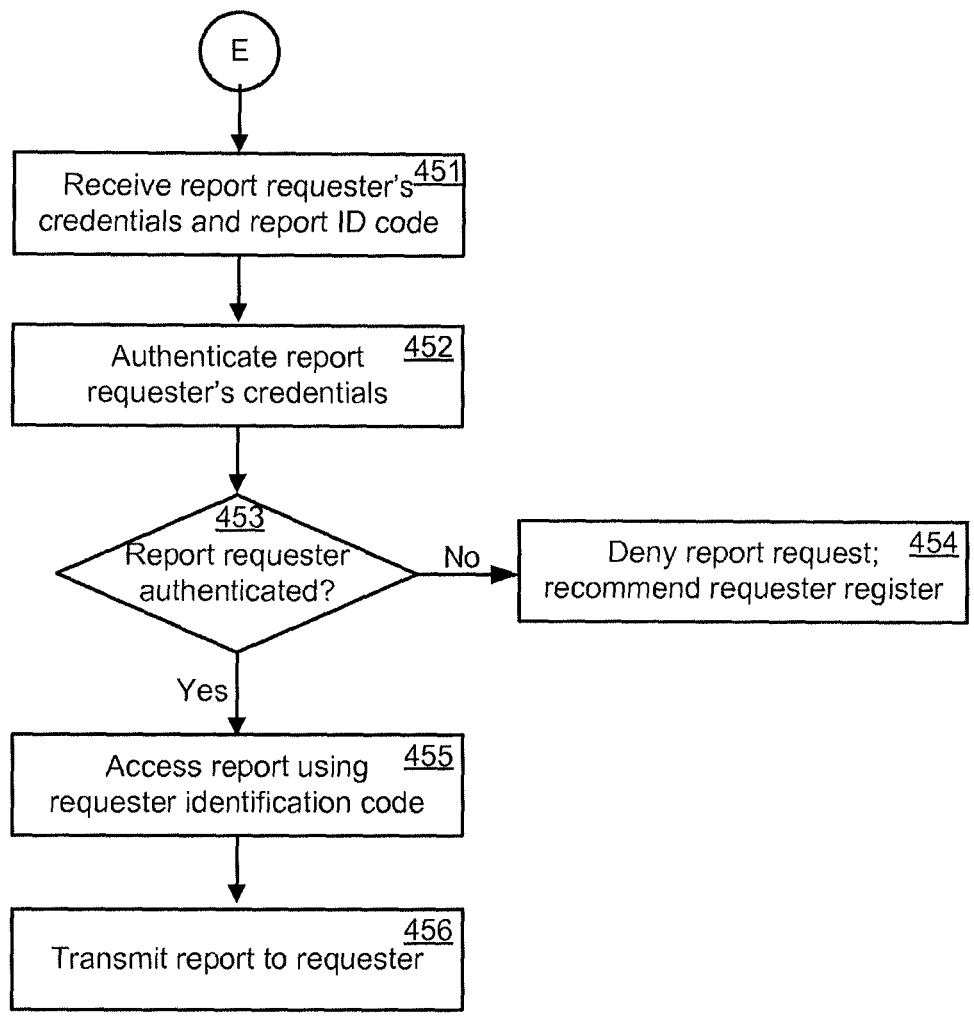

FIG. 3 is a flow chart illustrating an example of a method of authenticating and storing data from registered sensors using a registered gateway. At block 305, the gateway receives data and identifying information or enumerators from a sensor.

Then at decision block 310, the gateway determines whether it has the information stored locally to authenticate the sensor and sensor data and where to upload the data. In some embodiments, the gateway is authorized by the enumeration server to aggregate data from particular sensors. Aggregation of data can be performed using a fixed routing table that works similarly to peer-to-peer computing where the gateway serves as a permanent route to the sensor data repository. In the case of a mobile gateway, the gateway serves as a conduit to a permanently established gateway that contains the final routing information. Data that arrives at the permanent gateway is discarded or forwarded, depending on the authentication process for the sensor and data.

If the gateway has sufficient information to authenticate the sensor and manage its data (block 310—Yes), the process continues to block 325 to authenticate the sensor and data.

If the gateway does not have sufficient information to authenticate and manage the sensor's data (block 310—No), at block 315 the gateway queries the enumeration server 170. In some cases, the gateway can upload data to more than one enumeration server in which case the gateway queries all of the enumeration servers at block 315.

At block 320, the gateway receives response(s) to the query from the enumeration server(s). The response can include sensor registration data for authenticating the sensor and information about the type of data that the sensor is permitted to write to the sensor data repository 179.

Next at block 325, the gateway authenticates the sensor and its data. At decision block 330, the gateway determines if the sensor and its data have been authenticated. If the sensor is unregistered or the data is not authorized (block 330—No), at block 335 the gateway rejects the sensor data and does not upload the data to the sensor data repository. If the sensor is registered and the data has been authorized (block 330—Yes), at block 340 the gateway uploads the sensor data to the sensor data repository. If there are multiple data repositories available, the gateway uploads the sensor data to the appropriate data repository as determined either by the enumeration server that responded to the query at block 315 or by information stored in a local memory accessible by the gateway.

At block 345, the gateway can also upload additional validation information with the sensor data, such as the date and time the data was collected and uploaded, the sensor that provided the data, and any relevant information pertaining to how the data was collected that the sensor provided.

In some cases, the sensors have the ability to transmit their data directly to the enumeration server that controls access to the data repository. The enumeration server would then perform the gateway functions for authenticating the sensor and its data at block 325 and uploading authorized data.

FIGS. 4A-4F show flow charts illustrating an example of a method in which the system interacts with entities wishing to upload data, request data, make an initial data analysis request, upload a data report, or request a data report.

At decision block 410, the system determines if a user/entity wants to upload data to the data repository. If the user wants to upload data (block 410—Yes), at block 411 the system receives the data uploader's credentials and the data along with metadata describing the data. The metadata can include a log of the access requests to the data to maintain traceability of the data. Additionally, access statistics can further validate the credibility of the data, the sensor data repository, and/or the data analysts (e.g. from repeated use by a particular data analyst). The data uploader's credentials are used to determine if the uploader is registered with the system, whether the uploader is authorized to upload the data, and if the data is authorized. The uploader can be a person, sensor, or gateway. For a person, the credentials identify the person and the sensor that provided the data. For a sensor, the credentials identify the sensor. For a gateway, the credentials identify the gateway and the sensor that provided the data. Then at block 412, the system uses the credentials and metadata to authenticate the data uploader and the data by comparing the received credentials and metadata to corresponding credentials data or user profile stored in the registered user database 177 or sensor database 178.

Then at decision block 413, the system determines if the data uploader and data has been authenticated. If the uploader and data have not been authenticated (block 413—No), at block 414 the system denies the uploader's request to upload data to the data repository.

If the uploader and data have been authenticated (block 413—Yes), at block 415 the system uploads the data to the repository along with the provided metadata and the date and time the uploading occurs.

If the user does not want to upload data (block 410—No), at decision block 420, the system determines if the user wants to request data from the database. If the user wants to request data (block 420—Yes), at block 421 the system receives the data requester's credentials and the data being requested.

Then at block 422 the system authenticates the data requester and the data request. The data requester must be registered with the system. Additionally, the data requester should be authorized to access the data being requested. Next, at decision block 423, the system determines if the data requester and data request have been authenticated. If the requester and data request have not been authenticated (block 423—No), at block 424 the system denies the data request and can optionally recommend that the requester register with the system to obtain authorization for accessing the data.

If the requester and request have been authenticated (block 423—Yes), at block 425 the system identifies any preferred presentation format of the data that is stored in the data repository. Then at block 426 the system presents the requested data to the requester along with any other validation information requested.

If the user does not want to request data (block 420—No), at decision block 430, the system determines if the user wants to initiate a request that a data analysis be performed. If the user wants to initiate a request for a data analysis (block 430—Yes), at block 431 the system receives the data analysis requester's credentials and the system authenticates the analysis requester at block 432. The requester must be registered with the system to request a report. Additionally, the requester should be authorized to access the data to be analyzed in the report. Next, at decision block 433, the system determines if the analysis requester has been authenticated. If the analysis requester has not been authenticated (block 433—No), at block 434 the system denies the analysis request and can optionally recommend that the requester register with the system to obtain appropriate credentials to request an analysis.

If the analysis requester has been authenticated (block 433—Yes), at block 435 the system assigns an identification code to the requester's request. At block 436, the system searches in the database for analysts who have been authorized by the system to perform the type of data analysis being requested. The system sends at block 437 the identified analysts to the analysis requester along with the identification code to be used to identify the requested analysis. The system can also send information about each analyst, such as relevant experience, number of reports previously prepared, pricing, related URLs or other electronic addresses associated with the analysts, etc.

Then at block 438, the system receives the requester's selection of an analyst for performing the data analysis and links the identification code with the selected analyst in the analyst database and the requested report in the report repository and the registered requester database. Finally, at block 439 the system automatically and electronically notifies the analyst about the report request, such as via e-mail, and provides necessary data to the analyst. Notifying the analyst may be optional.

If the user does not want to request an analysis (block 430—No), at decision block 440, the system determines if the user wants to upload a report to the database. If the user wants to upload a report (block 440—Yes), at block 441 the system receives the report uploader's credentials and the associated identification code for the report.

At block 442, the system authenticates the report uploader using the provided credentials and the report ID code. If either the report uploader is not found to be registered with the system, or the report ID code does not match the report uploader, the report uploader is not authenticated. At decision block 443, the system determines if the report uploader has been authenticated. If the report uploader is not authenticated (block 443—No), at block 444, the system denies the report upload request.

If the report uploader is authenticated (block 443—Yes), at block 445 the system uploads the report and attaches relevant information to the report including the report uploader, the ID code, and the date and time of upload. The system stores the uploaded report with uploader information in the report repository and updates a table or index to permit the ability for users to later search for and locate the report.

If the user does not want to upload a report (block 440—No), at decision block 450, the system determines if the user wants to request a completed report. If the user wants to request a completed report (block 450—Yes), at block 451 the system receives the report requester's credentials and the identification code of the requested report. Alternatively or additionally, the system may receive a search query from the user that permits the user to search for and locate one or more desired reports.

At block 452, the system authenticates the report requester using the provided credentials and the report ID code. If either the report requester is not found to be registered with the system, or the report ID code does not match the report requester, the report requester is not authenticated. At decision block 453, the system determines if the report requester has been authenticated. If the report request is not authenticated (block 453—No), at block 454 the system denies the report request and can optionally recommend that the requester register with the system.

At block 455, the system uses the provided identification code to access the requested report stored in the report repository 169. Then at block 456, the system transmits the requested report to the requester.

The above described system would be useful in any situation where the integrity and traceability of the data is important, for example, a quantitative measurement of some aspect of a person's health, such as glucose levels, oxygen levels, heart rate, and blood pressure. The particular example of glucose monitoring of a diabetic patient is considered in more detail below.

The patient can register with the system and also register a wireless glucose sensor for measuring blood glucose levels. After taking a glucose measurement, the sensor sends the data to a glucose monitoring application on a smart phone registered with the system that aggregates the glucose level data obtained from the patient. Then the smart phone application sends the data to the server. If the server authenticates the smart phone (the gateway) and the wireless glucose sensor, and the glucose level data is authorized for uploading, the server stores the data in the data repository.

The patient can thereafter authorize his physician, who is also registered with the system, to access his glucose level data. Alternatively or additionally, the physician can rely upon a data analysis service to graph the data for presentation, and the physician can access the resulting graph. The physician can rely on the graphed data because the data is traceable—the data was measured with a registered glucose sensor, the smart phone that aggregated the data was also registered, the server authenticated both the sensor and the gateway prior to storing the data, and the server also authenticated the service provider who graphed the data. Moreover, because the system ensures that the graphed data is secure and traceable, the wireless glucose sensor is a medical device that is likely to receive product approval from the FDA (Food and Drug Administration).

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

What is claimed is:

1. A method comprising:
   receiving, via a gateway, data from a first sensor to store data in a database, wherein the gateway includes a routing table for routing the received data;
   determining that the first sensor is registered with an authentication server before allowing the data to be stored in the database by determining that a unique identifier of the first sensor matches a pre-stored identifier of one of a plurality of registered sensors at the authentication server;
   transmitting the authenticated data to an authentication server for storage in the database;

authenticating the first sensor in response to determining that the first sensor is registered with the authentication server; otherwise, determining that the first sensor is not authenticated;

storing the data of the first sensor in the database in response to the first sensor being authenticated; otherwise not permitting storage of the data from the first sensor in the database;

receiving a request from a data requester for the stored data;

determining that the data requester is registered with the authentication server before providing requested data from the database;

authenticating the data requester in response to determining that the data requester is registered with the authentication server; otherwise, determining that the data requester is not authenticated; and providing requested data from the database to the data requester only in response to the data requester being authenticated.

2. The method of claim 1, further comprising:

registering analysis requesters with a presentation server;

receiving a request from an analysis requester of an analysis of at least some of the data stored in the database;

authenticating the analysis requester only when the analysis requester is determined to be one of the registered analysis requesters; and allow the analysis requester access to the database to perform the analysis.

3. The method of claim 1, wherein the aggregated data is obtained from sensors reading RFID (radio frequency identification) tags.

4. The method of claim 1, wherein at least some of the registered sensors measure an aspect of a person's health, the data is personal medical data, and further wherein the mobile gateways include smart phones.

5. The method of claim 1, wherein the data is an encrypted hash value, and further wherein the hash value is generated by a secret hash function known to the sensor that generated the data and the authentication server.

6. The method of claim 1, wherein at least some of the registered sensors measure environmental conditions, the data is environmental data, and further wherein the data analysis provides recommendations for improving crop yields.

7. The method of claim 1, wherein the data requester specifies a presentation format for the requested data, and further wherein subsequent requests for data made by the data requester are presented in the specified presentation format.

8. The method of claim 7, wherein the presentation format is selected from one of the following: instantaneous values of sensor data, graphing of a time series of sensor data with tolerance bars, linear regression or curve fitting of sensor data, and correlation of sensor data against another form of metadata stored in the database.

9. The method of claim 1, wherein authenticating the data requester comprises ensuring payment information is obtained from the data requester for the requested data before providing data to the data requester.

10. A system for authenticating data provided by a network of multiple sensors and providing an authenticated presentation of the data, the system comprising:

a fixed gateway comprising memory that stores routing information for routing data aggregated from the network of sensors to an authentication server, and further stores sensor information about which sensors are registered so that the fixed gateway is configured to authenticate a given sensor; and a mobile gateway comprising memory and a processor that is configured to aggregate data from the network of sensors, and wherein each of the mobile gateways includes a routing table for routing the aggregated data to the fixed gateway, wherein the authentication server configured to:
  authenticate the fixed gateway;
  receive the data from the fixed gateway;
  store the data in the database; and
  receive a request from a data requester;
  determining if the data requester is authenticated to receive data from the database;
  providing requested data from the database to the data requested only when the data requester is authenticated by the authentication server.

11. The system of claim 10, further comprising
a presentation server configured to:
  register analysis requesters with the presentation server;
  receive a request from an analysis requester of an analysis of at least some of the data stored in the database;
  authenticate the analysis requester only when the analysis requester is determined to be one of the registered analysis requesters; and
  allow the analysis requester access to the database to perform the analysis.

12. The system of claim 10, wherein when the fixed gateway does not have the information to authenticate a sensor, and the fixed gateway queries the authentication server for authentication information.

13. The system of claim 10, wherein the authentication server is one of multiple authentication servers, and further wherein the routing information stored at the fixed gateway routes data aggregated from the network of sensors to a predetermined one of the multiple authentication servers.

14. The system of claim 10, wherein the data is obtained from sensors reading RFID (radio frequency identification) tags to determine a position of the RFID tags.

15. The system of claim 10, wherein the presentation server is further configured to provide a list of analysts for performing the analysis.

16. A method comprising:
receiving first data from a first sensor at a server;
receiving second data from a second sensor at the server;
aggregating, via a gateway, data from at least some of the sensors and
transmitting the aggregated data to an authentication server for storage in a database, wherein the gateway includes a routing table for routing the aggregated data;
authenticating the first sensor in response to determining that the first sensor is registered with the server;
denying authentication of the second sensor in response to determining that the second sensor is not registered with the server;
storing the received first data in the database in response to the first sensor being authenticated by the server as a registered sensor;
preventing storage of the received second data in the database in response to the second sensor being denied authentication to the server.

17. The method of claim 16, further comprising:
registering analysis requesters as registered sensors;

receiving a request from an analysis requester for an analysis of at least some of the stored data;

authenticating the analysis requester in response to determining that the analysis requester is authorized with the server as a registered analysis requester; and providing access to the at least some of the stored data to the analysis requester or an analyst only in response to the analysis requester being authenticated.

18. The method of claim 17, further comprising ensuring payment information is obtained from the analysis requester for the requested analysis before providing analysis to the analysis requester.

19. The method of claim 16, wherein the first data is obtained from sensors reading RFID (radio frequency identification) tags to determine a position of the RFID tag.

* * * * *